United States Patent [19]

Enbergs

[11] Patent Number: 5,277,686
[45] Date of Patent: Jan. 11, 1994

[54] METHOD AND DEVICE FOR CHANGING TOOLS IN MACHINE TOOLS

[75] Inventor: Bernhard Enbergs, Dorsten, Fed. Rep. of Germany

[73] Assignee: Sandvik AB, Sandviken, Sweden

[21] Appl. No.: 933,094

[22] Filed: Aug. 21, 1992

[30] Foreign Application Priority Data

Aug. 21, 1991 [DE] Fed. Rep. of Germany ....... 4127622

[51] Int. Cl.[5] .......................................... B23Q 3/157
[52] U.S. Cl. .......................................................... 483/1
[58] Field of Search ............... 483/31, 36, 69, 46, 483/59, 35, 10, 13, 8, 1

[56] References Cited

U.S. PATENT DOCUMENTS

| | | | |
|---|---|---|---|
| 4,581,811 | 4/1986 | Eckle | 483/36 |
| 4,651,405 | 3/1987 | McMurtry | 483/31 |
| 4,761,877 | 8/1988 | Rupp | 483/59 |
| 4,860,429 | 8/1989 | Von Haas | 483/46 |

FOREIGN PATENT DOCUMENTS

| | | | |
|---|---|---|---|
| 0275911 | 7/1988 | European Pat. Off. | |
| 2738434 | 7/1988 | European Pat. Off. | 483/69 |
| 2545928 | 5/1977 | Fed. Rep. of Germany | |
| 3813670 | 11/1989 | Fed. Rep. of Germany | |
| 90242 | 7/1980 | Japan | 483/35 |
| 555220 | 10/1974 | Switzerland | |

*Primary Examiner*—William Briggs
*Attorney, Agent, or Firm*—Burns, Doane, Swecker & Mathis

[57] ABSTRACT

A tool is positioned relative to a clamping unit by gripping the tool with a gripping device and moving the gripping device to position the tool in a socket of the clamping unit. Simultaneously, a motor-powered drive wheel, which is mounted on the gripping device, becomes meshed with a wheel of the clamping unit. The driven wheel is rotated and causes tool to be moved axially into a tightly clamped position within the socket. The gripping device is movable in radial and axial directions and is capable of removing the tool from the clamping unit and transporting the tool to and from a magazine.

14 Claims, 2 Drawing Sheets

METHOD AND DEVICE FOR CHANGING TOOLS IN MACHINE TOOLS

RELATED INVENTION

This invention is related to that disclosed in concurrently filed application Ser. No. 07/933,103 by the same inventor, the disclosure of which is incorporated herein by reference.

BACKGROUND OF THE INVENTION

The present invention relates to a method and apparatus for changing tools in machine tools by releasing and clamping the shank of a tool in a clamping device of the machine with the following steps:

I. For Releasing the Tool a) moving the gripping device substantially in radial direction to the clamped tool and gripping same outside the clamped region;

b) releasing the clamping device with the aid of an actuation element;

c) extraction of the shank out of the clamping device by axial outward movement of the gripping device;

d) transport of the tool with the aid of the gripping device to a magazine, depositing the tool and, if needed, gripping a new tool outside the region to be clamped.

II. For Clamping the Tool e) transport of the tool with the aid of the gripping device into a position of axial alignment of the shank with a shank receiving part of the clamping device;

f) insertion of the shank into the shank receiving part by axial inward movement of the gripping device;

g) tightening the shank in the clamping device with the aid of the actuator;

h) releasing the gripping device from the shank and moving away the gripping device substantially in the radial direction of the shank.

The present invention also relates to a device for changing tools on a machine tools, with a gripping device which is movable in the radial direction of a clamped tool, in order to grip the tool outside its clamped area, and with an actuator which engages a clamping element and releases the shank out of a clamping device of the machine. The gripping device is movable further in an axial outward direction taking along the loosened tool in this operation, and brings it to a magazine where it is deposited. The gripping device seizes a new tool, carries it to the clamping device, brings the shank of the tool in an axially directed position with a shank receiving part of the clamping device and inserts the shank into the clamping device whereupon the actuator engages the clamping element and, by actuating the latter, tightens the shank.

Such tool changing methods and devices are known per se from modern machine tools. In them, the clamping device may be provided on either a stationary or a rotating machine part. The clamping device has generally a hollow space which can receive the shank of a tool fittingly, the center of this hollow space being defined by an axis without the shank, and the hollow space necessarily being symmetrical in rotation. The center of the shank is also defined by an axis. As used herein, the term "tool" means a tool per se, a tool holder or other modular intermediate elements, which indeed can be released per se from the actual machining tool, but which in operation are rigidly connected with a machining tool and act as an adapter or an extension or generally as a tool holder and are clamped with a corresponding shank in the clamping device.

Modern machine tools are highly complicated machining stations, by means of which it is possible, according to a programmed series of movements, to perform a number of very different machining processes on a tool, which cannot be carried out with a single tool, so that between the individual machining processes, changes of tools have to be carried out. This is effected automatically by means of the tool changing device and method described above.

At any rate, the hitherto known methods and devices for changing tools on machine tools often require considerable expense in machinery and programming. On the one hand, the gripping device, for the insertion and removal of the tool relative to both the clamping device and the magazine, must perform a specific sequence of movements. Also, the actuator for the clamping device must also be brought into and out of engagement with a clamping element and the actuator has to be controlled in a manner coordinated with the movement of the gripping device. So-called industrial robots come very close to such machine-tools, or they are also termed to be such. Furthermore, in this connection, the difficulty arises that the actuator often can engage the clamping element only when the tool is in a specific position (and possibly only when the clamping device is in a specific position if the latter is rotatable), so that it becomes necessary, for example, to take steps to stop the shaft of the clamping device always in a specifically defined position, and also to bring the tool shank into the clamping device only in a specifically defined position relative to the actuator. The mechanical elements to be provided for this purpose, as well as also any program parts in the program which controls the tool changing process, are correspondingly cumbersome and expensive.

SUMMARY OF THE INVENTION

It is therefore the object of the invention to provide a method and a device of the type first mentioned above which, in terms of both a programmed run and of a mechanical construction, are simpler.

With respect to the method referred to this object is achieved in that the gripping device moves the tool toward a tool-receiving portion while simultaneously moving an actuator into a position in which either it engages directly with a clamping element of the clamping device, or by means of a simple swiveling or sliding movement can be brought into engagement with the clamping element.

With respect to the device, the problem at the basis of the invention is solved in that the actuator is mounted on the gripping device, and indeed in such a manner that, when the gripping device holds the tool in the position inserted into the clamping device, released or clamped, is itself in a position in which it is in direct engagement with the clamping element or directly mounted in front of it, so that, by means of a simple swiveling or sliding movement, it can be brought into engagement with the clamping element.

According to the invention, therefore, the movement of the actuator is directly (i.e., mechanically) coupled with the movement of the gripping device and the actuator is mounted on the gripping device. Therefore, it is not necessary for a control appliance to have to control the advance of the actuator and its drive depending upon the position taken by the gripping device, and in addition to have to detect the movement of the gripping device. On the contrary, it is the gripping device itself which takes over the role of moving the actuator onto a corresponding clamping element of the clamping device precisely at the moment when it has to clamp or release the shank. Preferably, naturally, the actuator, as a result of the movement of the gripping device is brought directly into engagement with a corresponding clamping element which is mounted on the clamping device. Possibly, however, an additional swiveling or advance movement may be necessary to ensure the final engagement of the actuator with the clamping element. Thus, in very simple manner, and also directly when the engagement position is reached, the drive for the actuator can be switched on, so that the clamping element is moved by the actuator in the desired direction for the clamping or releasing of the shank from the actuator. In the simplest version, the corresponding movements or drives can be set off by switches, e.g., contact switches, only which are themselves actuated by the motion of the gripping device.

In this connection, preference is given to a form of the method in which the gripping device holds the tool solid in rotation during the clamping or releasing process.

The actuator can in fact, depending on the arrangement of the clamping element and on circumstances, transmit a torque onto the clamping device and thus also onto the shank of the tool, so that the holding of the tool solid in rotation by the gripping device supplies the necessary counter-force. Otherwise, correspondingly to known devices, a device, again costly, would have to be provided for securing the clamping device. It will be appreciated that holding solid in rotation is not necessary when the clamping device is anyway mounted on a stationary machine part. In many machine tools, however, the change takes place also on different clamping devices which are sometimes rigid, sometimes rotatable, so that the holding solid in rotation of the tool by the gripping device is in any event appropriate.

In addition, preference is given for the tool change to a method in which the rotary position of the respective tool relative to its axis and/or of the clamping device relative to its axis is detected. In this manner it is possible to determine an engagement of the gripping device established relative to the rotational position, as well as also of the actuator in the desired manner. It has been found to be particularly appropriate in this connection to adopt a form of the method whereby, before releasing the tool from a rotatable clamping device, the gripping elements of the gripping device, even if the latter has already reached its position on the tool in which the actuator also is in engagement with the clamping element, initially still remains out of engagement and the entire clamping device is rotated by the drive of the actuator and the engagement of the latter on a clamping element, until there is achieved a desired rotating position, whereafter the gripping elements engage on the tool and hold it solid in rotation. The further driving of the actuator then effects no rotation of the clamping device any longer, as the latter in the clamped state of the tool is rigidly connected with the clamping device, but it effects only the release of the clamping element, so that consequently the shank of the tool can be removed from the clamping device.

As already stated, the preference is given in the device of the invention to a stationary mounting of the actuator on the gripping device, so that thus, in bringing the gripping device up to the clamping device, i.e., therefore, either on the introduction of the tool into the shank receiving part, or on the advancing to the clamped tool, the actuator is brought directly in engagement with a corresponding clamping element. Appropriately, in this connection, the actuator has a part circulating on a closed path, and is preferably a pinion. It will be appreciated that instead of a pinion it will also be possible to use a rotating toothed element, belt, chain or the like as actuator.

The clamping device which of itself is not the subject of the present invention, correspondingly has a clamping element with toothing into which such a pinion (possibly also a chin or toothed element) can engage. The engagement between such a pinion and the clamping element is most simply effected if the part is mounted in the form of a union nut on a clamping device. The clamping element, however, could also be designed as a screw projecting in axial direction with toothing for engagement with the pinion, or could be actuated by means of a toothed wheel rim or the like mounted externally on the clamping device. It could also be conceivable to secure the actuator by means of a toggle lever or the like on the gripping device, the toggle lever being compulsorily swiveled during the movement of the gripping device, so as to allow the actuator to go into, or come out of, a corresponding lateral opening of the clamping device, behind which the clamping element is situated.

Specifically preferred is a form of embodiment of the invention wherein the pinion axis in engagement position with the clamping element is parallel to the axis of the clamping device. This permits a space-sparing, and at the same time, constructively simple arrangement of the actuator of the gripping device.

Finally, in the preferred form of embodiment of the invention there is provided a detection device for the rotating position of the tool and/or of the clamping device.

Such a detection device may be, for example, a semiconductor element which can be mounted on the gripping device. The corresponding semiconductor chips which contain the data on the rotary position can then be arranged on the tool or tool shank and/or on the clamping device or the shank receiving part of the clamping device in such a manner that they can be read off by the reading device on the gripping element. The reading device may also operate on an optical basis, e.g., as a combination of LED and light rays emitted by one of the elements, possibly also deflected by mirrors. Similarly, bar codes may also be provided on the tool and/or the clamping device. In the simplest form, a detection device for the rotary position can also operate purely mechanically, e.g., in the form of a spring-mounted pencil connected with a switch which engages into a recess provided along the periphery of the clamping device or of the tool, when the corresponding position has been reached. Naturally, instead of the recess there may be also provided a projection which pushes the pencil or pin away.

Finally, the preference is given to a form of embodiment of the invention in which the gripping device has gripping elements which are actuable independently of the movement of the gripping device and can hold the tool solid in rotation during the clamping and releasing process.

In connection with the preferred method for changing tools it has already been mentioned that such gripping elements can apply the necessary counter-force on the actuation of the clamping element and, if desired, can also initially remain out of engagement.

Finally, preference is given to an embodiment of the tool changing device of the invention wherein the gripping device can be moved along a L-shaped path, whereby the angle apex of the "L" corresponds to the position on the clamping device in which the gripping device holds the tool in clamped state, one L-member pointing in axial direction of the clamping device, and the other in radial direction of the clamping device.

The axial direction of movement is necessary so as to be able to insert the shank into a shank receiving part, and to extract it therefrom.

The movement of the gripping device in radial direction is appropriate in as far as the clamping device with the connected machine part, and also the tool itself can be relatively projecting in radial direction, so that a movement away of the gripping device in axial direction would only be possible with difficulty. Also the piece, which is brought into the vicinity of the tool, could come in conflict with the gripping device were the latter not be sufficiently removed from the clamping device or the tool, in which connection, in at least one radial direction, adequate space should be available in order to take the gripping device outside the range of influence of the other movable parts.

The further path of movement of the gripping device for depositing a tool taken out of the clamping device, and for bringing on a new tool is largely as the operator prefers, is effected in conventional manner, and need not be described in greater detail here.

BRIEF DESCRIPTION OF THE DRAWINGS

The objects and advantages of the invention will become apparent from the following description of preferred embodiments thereof in connection with the accompanying drawings in which like numerals designate like elements, and in which.

DETAILED DESCRIPTION OF THE PREFERRED EMBODIMENTS OF THE INVENTION

Figure 1:
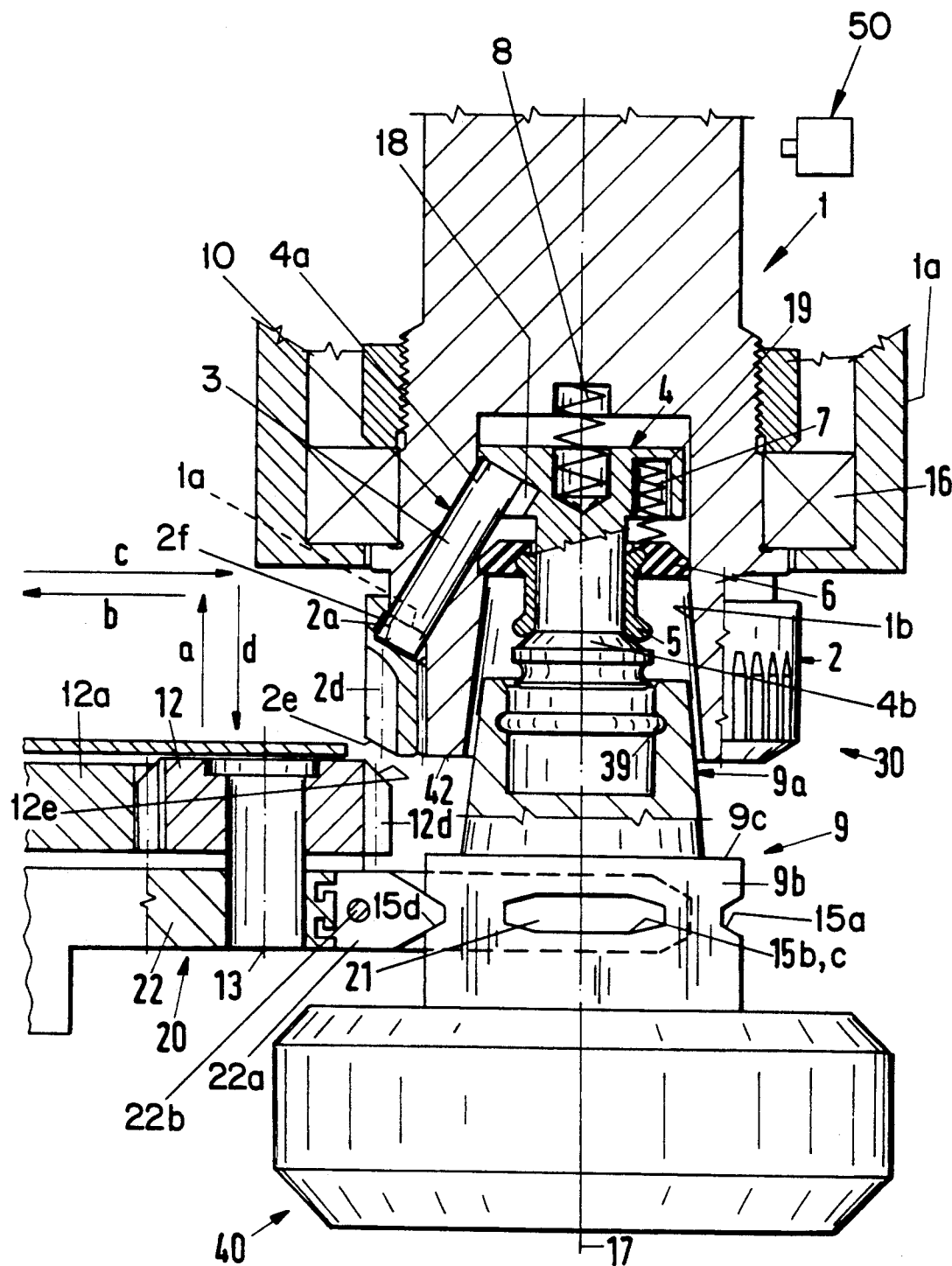
FIG. 1 is a longitudinal sectional view through a clamping device and gripping device according to the invention as a shank is being inserted into a socket of a rotatable shank-receiving part.
Figure 2:
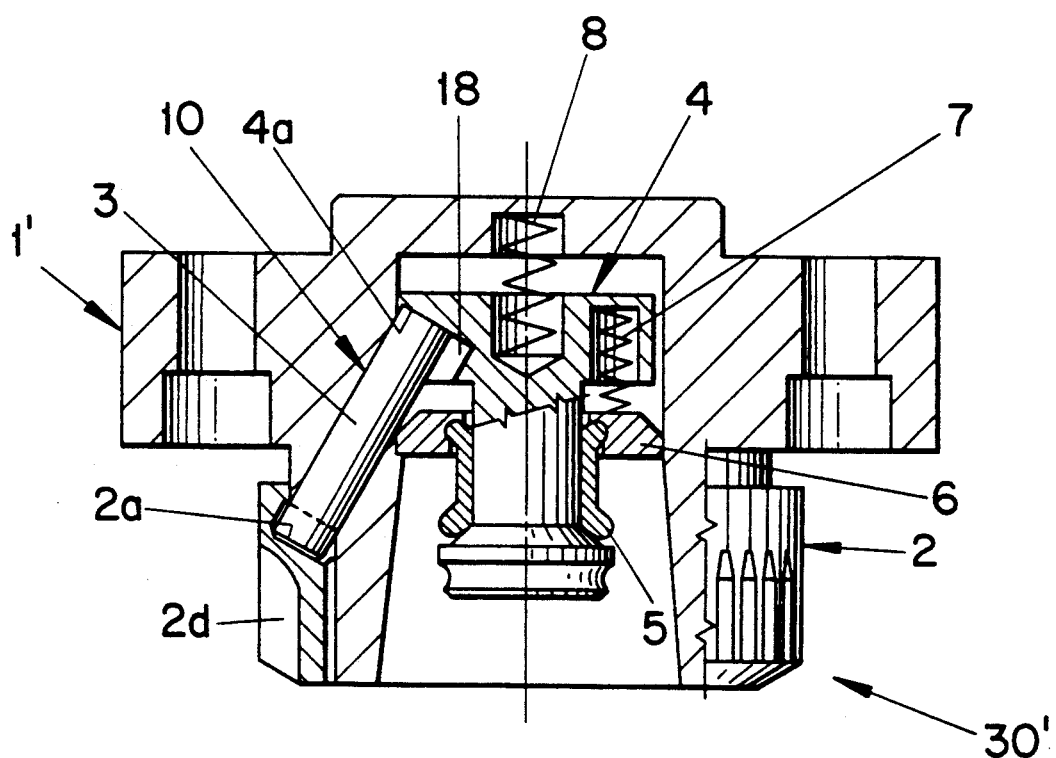
FIG. 2 is a longitudinal sectional view taken through a non-rotatable type of shank-receiving part.

There is seen in FIG. 1 a clamping device or unit 30 for a shank receiving part 1 which is rotatably mounted to a housing 1a by a bearing 16. Alternatively, as depicted in FIG. 2, the shank receiving part 1' could comprise a fixed (non-rotatable) machine part.

The shank receiving part 1 has a cavity or socket 1b tapering axially inwards to receive a correspondingly tapered shank part 9a of the shank 9 of a tool 40. As noted earlier, the term "tool" means a tool per se, or a tool holder, or other elements possessing a shank. The tool 40 is only indicated schematically and could also be simply a tool holder to which a machining tool (e.g., a cutter, hard metal cutter plates for drilling, etc.) is fixed. It is only necessary that this tool should have a shank 9 which can be received in the receiving part 1 of the clamping device 30 and tightened therein, and that the tool, or a part 9b of the shank 9 remaining outside the clamping device 30 can be seized by a gripping device 20.

The gripping device 20 comprises a movably mounted fork 22 which includes a pair of parallel arms 22a (only one arm 22a being depicted) which are spaced apart in a direction perpendicular to the axis 17. Each arm 22a carries at its outer end a gripping element 21 which projects laterally toward the other arm. Each gripping element is configured to fit within one of four identical notches 15a-15d formed in a cylindrical shank part 9b. The notches 15a-15d are circumferentially spaced by equal distances. Note that both notches 15b, 15c are visible in FIG. 1 because they are radially aligned in a direction perpendicular to the plane of the drawing. The gripping element 21 shown in FIG. 1 is engaged in the notch 15b located farthest from the viewer; that gripping element 21 is visible through the notch 15c located closest to the viewer.

When the fork 20 approaches the tool 40 in radial direction c, the arms 22a are spaced apart by a distance greater than the diameter of the shank part 9b so that the arms straddle that shank part. Then, the arms 22a are moved toward one another by a suitable mechanism such as an electric solenoid 22b which interconnects the arms 20a. Instead of being arranged to engage the notches 15b, 15c, the fork could instead be arranged to engage the other two notches 15a, 15d and to move in a radial direction oriented perpendicular to the direction b (i.e., into and out of the plane of the drawing). The particular structure of the gripping device 20 is not critical to the present invention and thus any conventional gripping device could be employed. However, by using an arrangement in which locking elements fit into specifically located notches, the rotational orientation of the tool is defined by the location of the notches, which orientation is maintained during the entire travel of the tool during a tool changing process, because the tool is not rotated even in the storage magazine.

The clamping device 30 contains, in addition to the shank receiving part 1, one union nut 2 which is screwed on an external thread of the front end of the shank receiving part 1. This union nut 2 has a conical inner surface 2a on which lie three pins 3 that are equidistantly spaced around the periphery of the shank-receiving part 1 and that extend inwards through holes 10 in the shank receiving part 1. The other ends of the pins 3 lie on suitably shaped slanting surfaces 4a in recesses 18 on a pull rod 4. By rotating the union nut 2, the pull rod 4 is displaceable in axial direction due to the engagement of the pins 3 with the pull rod. In this arrangement the pull rod 4 is tensioned in an axial outwards direction by a spring 8.

The movement of the gripping device 20 is diagrammatically shown by the arrows a, b, c, d, the movement a corresponding to the axial inward movement of the shank 9 into the shank receiving part 1, and the direction of movement d corresponding to the axial outward movement therefrom. For clamping, therefore, the shank part 9a is inserted in the direction a by the gripping device 20, the gripping elements 21 of which engage in the notches 15 of the shank part 9b. The shank part 9b is designed as a hollow part so that the lower portion of the pull rod 4 can enter the hollow shank part 9a. The lower thickened heads of clamping fingers 5 are situated substantially at the level of an annular groove 39 formed in the inner side of the hollow shank part 9a.

By rotating the union nut 2 in a clamping direction, the pull rod 4 is, by the pins 3, moved axially inwards.

The outer portion of the pull rod has a conical surface 4b which moves within the clamping fingers 5 in an axial inward direction. The clamping fingers 5 are mounted on a holding ring 6 (preferably formed of an elastomeric material) which is biased away from the upper portion of the pull rod 4 by means of springs 7 which are disposed in a hollow space 19 of the pull rod. Thus, due to the axial inward movement of the pull rod 4, the fingers 5 are spread outwards by the conical surface 4b to engage the groove 39. Then, the fingers 5 are moved in the axial direction along with the pull rod 4 when the nut 2 is rotated. Consequently, the fingers 5, the shank part 9a, and the entire tool 40 move simultaneously in the axial inward direction. The outer surface of the shank part 9a is brought to bear tightly against the inner surface of the cavity 1b in the shank receiving part 1. In the finally clamped position, a radial surface 9c formed at the transition of the shank part 9a and the shank part 9b bears tightly against the front face 42 of the shank receiving part 1, so that the position of the tool is exactly defined. In the preferred embodiment of such a clamping device, the shank part 9a, and also the corresponding receiving space of the shank receiving part 1, have a polygonal, preferably triangular cross-section with rounded corners and convex side surfaces.

Further details of the clamping device descried above will be found in the afore-mentioned related application Ser. No. 07/933,103.

In accordance with the present invention, a pinion 12 is carried by the gripping device 20, the pinion 12 being rotatably mounted around an axis 13 on the fork 20. When the shank 9 is aligned with the clamping device 30, the axis 13 extends parallel to the longitudinal axis 17. The driving of the pinion 12 may be effected in any standard manner such as by a motor-driven toothed wheel 12a, the motor and wheel 12a being carried by the gripping device 20. The union nut 2 has, for engagement with the toothing 12d of the pinion 12, an outer toothing 2d. The mutually facing ends of the teeth 2d, 12d are beveled at 2e, 12e which considerably facilitates the mutual engagement of the teeth during the axial inward movement of the gripping device in the direction of the arrow a, and makes this possible also when the teeth 2d, 12d are not perfectly aligned axially with one another. If need be, other guiding aids can also be provided on these slanting bevel surfaces, ensuring a meshing of the teeth 2d, 12d.

As will be seen, in any event, the two sets of teeth 2d, 12d, during axial alignment of the tool 40 with the clamping device 30, are sufficiently aligned with each other that they can come together in response to pure axial movement a. The pinion 12 can be easily rotatable in this condition. The movement of the gripping device is stopped as soon as the tapered outer surface of the shank part 9a contacts the correspondingly tapered inner surface of the shank receiving socket 1b. This occurs before the shank part 9a assumes its final tightly clamped position. On the contrary, this final clamped position is not reached until the subsequent rotation of the pinion 12, e.g., by means of the electric or pneumatic motor, which through the engagement of the teeth 12d, 2d, turns the union nut 2 in the clamping direction. As a result, the pull rod 4 is moved axially inwards, whereupon the fingers 5 come into engagement with the groove 39 and pull the shank part 9a tightly into the shank receiving part until surfaces 9c and 42 abut one another. As this occurs, the gripper elements 21 hold the tool 40 against rotation and thus counteract the torque applied to the nut 2 by the pinion 12. The tool-receiving part 1 on which the clamping device is mounted need not, therefore, be secured against rotation.

Subsequently, the gripping elements 21 are released and the entire gripping device 20, together with the pinion 12, is moved away in the radial direction b from the clamping device 30 and the tool 40. It will be appreciated that the arrangement of the two clamping arms 22a could be other than shown, e.g., the arms could be arranged such that the gripping elements 21 engage the notches 15a, 15d, whereby the gripping device would move in a radial direction perpendicular to direction b.

For the releasing and removal of the tool 40, the gripping device is moved in the direction of the arrow c towards the clamping device and the tool. The teeth 2d, 12d lie at the same axial height, and thus are brought directly into mutual engagement as soon as the gripping device 20 has reached the shank part 9b.

In the case of a rotatably mounted tool-receiving part 1 (FIG. 1), wherein the rotational position of the clamping device 30 is not clearly defined according to a preceding machining process, it is preferable to provide a detection device 50 for detecting the rotational position of the clamping device 30, which device 50 may be a semiconductor device. If desired, the device 50 could be mounted on the gripping device. A corresponding semiconductor chip which contains the desired information on the rotational position, can in this case be preferably mounted on a standing machine part, possibly also on a rotating machine part. Thus, at the beginning of the tool-releasing operation, if the clamping unit 30 and/or the tool are not in a desired rotational position, the arms 22a are actuated to move the gripping elements 21 out of engagement with the notches 15. By then rotating the pinion 12, the union nut 2 is turned, either in the tool-releasing or tool-tightening direction. As a result of the rigidly clamped state of the tool, the union nut 2 will not rotate relative to the tool-receiving part 1 (and thus does not move axially) regardless of the direction in which it is rotated. Rather, the entire clamping device 1, 1b, 2, 4, 10 rotates together with the tool until reaching the desired rotary position as detected by the detection device 50. In this position, the gripping elements 21 are engaged into the notches 15b, 15c and thus secure both the tool shank 9, and the shank receiving part 1 against being rotated by the torque applied to the nut 2. The nut 2 thus turns on the outer thread of the shank receiving part 1 and moves in an axial outward direction, whereby its front face comes into engagement with the radial surface 9c of the shank and thereby forceably pushes the shank out of the cavity 1b. The gripping device 20 can then move in the axial outward direction shown by the arrow a, thus taking along with it the tool 40 and disengaging the teeth 12d, 2d.

The tool 49 is then moved by the gripping device in a conventional manner from the clamping device to a magazine (not shown) where it is deposited, and possibly a new tool 40 is seized by the gripping device 20 and introduced into the clamping device 30.

The tool changing device of the invention can also be used without a tool, i.e., it can be used merely to rotate the clamping device to a desired position. In that operation, the pinion 12 and the nut 2 produce a desired rotational position of the rotatable clamping device 30. This is possible because the axial displacement of the nut 2 is restricted in both directions, namely in the axial inward direction by the portion of the shank receiving part 1 extending beyond the diameter of the external thread, and in the axial outer direction by a conical inner surface 2f of the nut extending perpendicularly to the surface 2a, which surface 2f bears against the outer sides of the pins 3 and prevents a further turning of the nut. When the nut is continued to be rotated after reaching either of those terminal axial positions, the shank-receiving device 1 is rotated.

The gripping device of the invention is simpler than most other known tool change devices, whereby the advantages of this invention become clear above all in conjunction with a fitting clamping device in the form of the union nut 2 and the associated parts. As already mentioned, however, other clamping constructions which do not work with a union nut are conceivable in conjunction with the present invention. A special advantage of the invention also lies in the fact that the gripping device, during a rotation of the clamping element, supplies a necessary counter-torque, so that in the case of a rotary shank-receiving part, no locking devices have to be provided for holding the shank-receiving part against rotation.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A method of positioning a tool relative to a clamping unit having a first toothed wheel rotatable about a first axis, and a clamping member movable in response to rotation of said first toothed wheel, said method comprising the steps of:
   A) moving a gripping device in a radial direction oriented perpendicular to said first axis and gripping said tool therewith;
   B) moving said gripping device parallel to said first axis to position said tool in a tool-receiving portion of a clamping unit while simultaneously positioning a second toothed wheel, which is mounted for movement with said gripping device, in meshing engagement with said first toothed wheel;
   C) rotating said second toothed wheel about a second axis extending parallel to said first axis to rotate said first toothed wheel for operating said clamping member in a manner moving said tool axially to a tightly clamped position in said tool-receiving portion; and
   D) releasing said gripping device from said tool.

2. A method according to claim 1 further including removing said tool by the steps of:
   E) gripping said clamped tool with said gripping device while simultaneously positioning said second toothed wheel, which is mounted for movement with said gripping device, at a location for operable connection with said clamping unit;
   F) energizing said second toothed wheel for operating said clamping unit in a manner moving said tool axially out of said tightly clamped position; and
   G) moving said gripping device and tool to a storage magazine.

3. A method according to claim 2 further including the steps of gripping a new tool with said gripping device at said magazine, and repeating steps B, C and D for clamping said new tool in said tool-receiving portion.

4. A method according to claim 1, wherein step B comprises placing said second toothed wheel in direct driving engagement with said clamping unit simultaneously with the arrival of said actuating device at said location.

5. A method according to claim 1, wherein during steps B and C said gripping device holds said tool against rotation.

6. Apparatus for moving a tool relative to a tool-clamping unit, comprising:
   a tool-clamping unit including:
      a tool-receiving portion, and
      tool-displacing means actuable for displacing a tool along a first axis to a tightly clamped position in said tool-receiving portion, said tool displacing means comprising a first toothed wheel rotatable about said first axis;
   gripping means for gripping and moving said tool axially into said tool-receiving portion, said gripping means being movable toward the tool in a radial direction extending perpendicular to said first axis and being axially movable along said first axis together with the tool to said tightly clamped position; and
   actuating means for actuating said tool-displacing means to displace said tool axially to said tightly clamped position, said actuating means comprising a second toothed wheel directly carried upon said gripping means so as to be brought into meshing engagement with said first toothed wheel simultaneously as said gripping means moves said tool axially into said tool-receiving portion, said second toothed wheel being rotatable about a second axis oriented parallel to said first axis.

7. Apparatus according claim 6, wherein said first and second toothed wheels include teeth having axially facing surfaces which are beveled to facilitate meshing of said teeth in response to movement of said second toothed wheel along said second axis toward said first toothed wheel.

8. Apparatus according to claim 6, wherein said tool-receiving portion includes a cavity for receiving a shank of the tool.

9. Apparatus according to claim 6, wherein said gripping means holds the tool against rotation.

10. Apparatus according to claim 6, wherein said displacing means selectively moves the tool to tool-clamping and tool-unclamped positions, whereby said apparatus constitutes means for removing the tool to an unclamped position for return to a storage magazine.

11. Apparatus for moving a tool relative to a rotatable tool-clamping unit, comprising:
   a tool-clamping unit including:
      a tool-receiving portion, and
      tool-displacing means actuable for displacing a tool axially to a tightly clamped position in said tool-receiving portion;
   gripping means for gripping and moving said tool axially into said tool-receiving portion;
   actuating means for actuating said tool-displacing means to displace said tool axially to said tightly clamped position, said actuating means being connected for movement with said gripping means so as to be brought to a location for operable connection with said tool-displacing means simultaneously as said gripping means moves said tool axially into said tool-receiving portion; and detecting means for detecting the rotational position of said clamping unit.

12. Apparatus according to claim 11, wherein said detecting means comprises a semi-conductor.

13. Apparatus according to claim 11, wherein said detecting device is an optical reader.

14. A method of clamping and removing a tool relative to a rotatable clamping unit:

I. said clamping being performed by the steps of:
   A) gripping said tool with a gripping device;
   B) moving said gripping device axially to position said tool in a tool-receiving portion of a clamping unit while simultaneously position an actuating device, which is mounted for movement with said gripping device, at a location for operable connection with said clamping unit;
   C) energizing said actuating device for operating said clamping unit in a manner moving said tool axially to a tightly clamped position in said tool-receiving portion; and
   D) releasing said gripping device from said tool;

II. said removing being performed by the steps of:
   E) gripping said clamped tool with said gripping device while simultaneously positioning said actuating device, which is mounted for movement with said gripping device, at a location for operable connection with said clamping unit;
   F) energizing said actuating device for operating said clamping unit in a manner moving said tool axially out of said tightly clamped position;
   G) moving said gripping device and tool to a storage magazine; and III. automatically detecting the rotational position of said clamping unit prior to one of steps A) and E).

* * * * *